No. 677,565. Patented July 2, 1901.
J. A. DUNN.
DENTAL CLAMP.
(Application filed Dec. 12, 1898.)
(No Model.)

Witnesses
Frank S Blanchard
Donald M Carter

Inventor:
J Austin Dunn

UNITED STATES PATENT OFFICE.

JESSE AUSTIN DUNN, OF CHICAGO, ILLINOIS.

DENTAL CLAMP.

SPECIFICATION forming part of Letters Patent No. 677,565, dated July 2, 1901.

Application filed December 12, 1898. Serial No. 698,986. (No model.)

*To all whom it may concern:*

Be it known that I, JESSE AUSTIN DUNN, a citizen of the United States, residing at Chicago, in the county of Cook and State of Illinois, have invented a certain new and useful Improvement in Clamps, of which the following is a specification.

My invention relates to dental clamps, and has for its object to provide a new and improved clamp of this description.

My invention is illustrated in the accompanying drawings, wherein—

Figure 1:
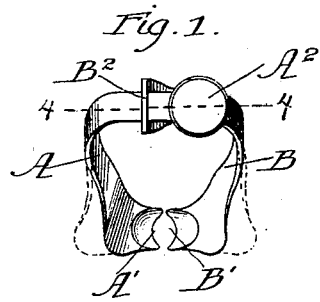
Figure 2:
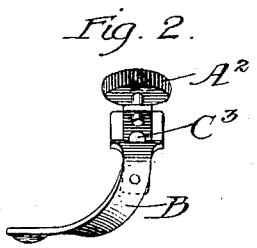
Figure 3:
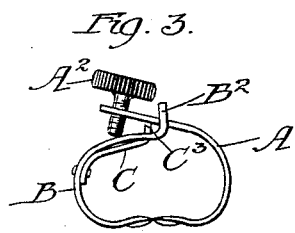
Figure 4:
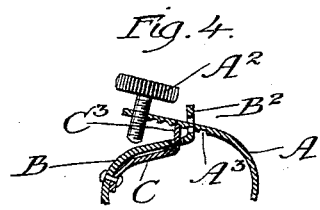
Figure 5:
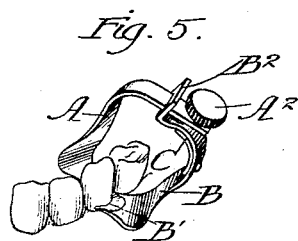
Figure 6:
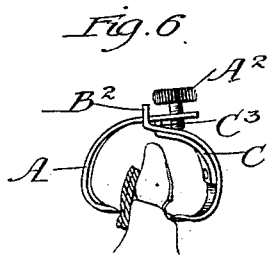

Figure 1 is a view of a clamp embodying my invention. Fig. 2 is a side view of the clamp shown in Fig. 1. Fig. 3 is a rear view of the clamp shown in Fig. 1. Fig. 4 is a section on line 4 4, Fig. 1. Fig. 5 shows the clamp in position. Fig. 6 shows the clamp in position with an improvised pad between one jaw and the tooth, so as to prevent injury to the gum.

Like letters refer to like parts throughout the several figures.

During the operation of filling teeth it is often necessary to use a clamp for holding the rubber dam in place or for holding the gum away from the cavity or for other purposes. By means of my present invention I have provided a clamp particularly adapted for these purposes.

Referring now to the drawings, wherein I have shown the clamp, omitting the rubber dam for clearness, said clamp consists of two jaws A and B, provided at one end with suitable beaks or bearing-faces A' B' and movably connected together, so that the beaks may be moved toward or away from each other. As shown, for example, in Figs. 1 to 4, the jaw B is provided with an upwardly-bent end $B^2$, the jaw A being movably connected with the jaw B by passing through an opening in said end. In the device illustrated I have shown the ends of the jaws provided with engaging faces as bent outwardly, so as to be in a different plane from the ends that are connected together. I provide the clamp with some suitable means for forcing the jaws toward each other, so as to engage the tooth with sufficient pressure to hold the clamp in position while it is being adjusted, but without enough pressure to cause pain or injury to the patient. In order to produce the best results in this direction, I prefer to have an elastic connection between the jaws, which tends to force them together with sufficient pressure to hold the clamp in place while it is being adjusted, and then to provide an independent means of reinforcing this pressure or of independently forcing the beaks of the jaws toward each other after adjustment has been made, so as to clamp the tooth with any amount of pressure desired. It is of course evident that various constructions may be used for this purpose, and, as herein illustrated, I use a spring C or other elastic device which normally tends to hold the clamp in position, so as to facilitate adjustment. This spring C preferably does not develop strength enough to cause the jaws to grip the tooth with the full pressure necessary and is so arranged as to allow the other means of clamping to be utilized when the parts are properly adjusted. As herein illustrated, the spring C is connected with one of the jaws of the clamp and engages the other jaw so as to tend to force the beaks together. The specific construction for purposes of illustration shows the spring fastened to the jaw B and turned upward at its end, so as to pass through an opening in said jaw, engaging the jaw A after it passes through the upturned end $B^2$ of the jaw B. In order to obtain the best results in the matter of adjustment, it is necessary to provide a holding means for holding the jaws, so that they will not normally slide one upon the other while the clamp is being placed in position and adjusted, but still permit them to be slid in this manner when the operator so desires in order to accommodate the clamp to various sizes of teeth. It is of course evident that any suitable means for this purpose may be adopted, and, as herein shown, I have formed the end of the jaw A with a series of holding-points, which in this instance consist simply of indentations $A^3$ to receive the end of the spring C. It will thus be seen that when the clamp is placed upon the tooth the end of the spring C, engaging any one of these holding-points, prevents the jaws from being slid one upon the other and temporarily, as it were, holds them in position, so as to allow the spring C to act in such a manner as to hold the clamp in place. When desired—for example, when the clamp is removed from the tooth—it will be seen that the jaws can be slid, so as to move the spring from one of these holding-points to another, so as to vary the distance between the beaks.

I have shown the independent clamping device, which is used to clamp the jaws against the tooth with any desired pressure after adjustment is made, as consisting of a screw or the like $A^2$, working in threads in one of the jaws and engaging the other jaw, so that when turned in one direction it will force the beaks of the jaws toward each other. This screw is so arranged as to allow the jaws to be slid one along the other when the user desires to vary the distance between the beaks of the jaws to correspond with the tooth upon which he is operating. When clamps are provided only with springs to force the jaws together, the spring must be strong enough to hold the clamp in the proper position when in use. It will be seen that if such a device is used it exerts its full pressure when first put on the tooth and does not permit of adjustment, thus causing unnecessary pain and injury to the patient. When the clamp herein illustrated is used, the jaws are slid one upon the other until the desired space between the beaks is obtained. The beaks are then spread apart and the clamp placed upon the tooth, the spring pressing the beaks toward the tooth with sufficient pressure to hold the clamp in position, but without pressure enough to cause pain or injury to the patient. The clamp may then be moved to the proper position and adjustment be made carefully and painlessly, and then the desired pressure may be obtained by operating the independent means for forcing the beaks together, which in this instance is the screw $A^2$. It will thus be seen that the desired pressure may be obtained as gradually as desired and that by the use of this device the pain and injury to the patient may be reduced to a minimum. By having a suitable holding device associated with the spring, which tends to prevent the jaws from being slid one upon the other, I am enabled to use forceps in putting the clamp in position upon the tooth, the jaws of the forceps being placed between the jaws of the clamp, so as to separate them. It will also be seen that this clamp may be adjusted to fit any-sized tooth and that therefore it may be used as a universal clamp and may be applied to any and all of the teeth. This clamp in view of its facilities for adjustment is especially adapted for the roots of teeth, lingual surfaces of incisors, very small teeth, large teeth, cervical cavities, and many other out-of-the-way places where it would be difficult, if not impossible, to utilize the ordinary form of clamp with any satisfaction. In cases, for example, where the cavity is at the cervical border or high up on the root of the tooth an improvised pad of varying thickness, made of bibulous paper or the like, may be placed beneath one of the jaws of the clamp, as shown, for example, in Fig. 6, thus preventing that jaw of the clamp from painfully pressing against the gum. The other jaw may then be moved or adjusted to the proper position and the screw tightened, so as to firmly clamp the device in position. It will be seen that under these conditions the jaw under which the improvised pad is placed may take the proper position above or below the gingival line at the neck of the tooth necessary to the successful working of the clamp. If the pad were not used, the jaw or beak under which it is placed would painfully dig into the gum and be a very serious objection to the use of the clamp in connection with such cavities, as is evident from an examination of Fig. 6.

I have shown in Figs. 1 to 6 a simple form of clamp embodying my invention; but it is of course evident that the parts may be varied in form, construction, and arrangement without departing from the spirit of my invention, and I have simply shown this construction for purposes of illustration. In this construction there are two separate jaws having opposed engaging faces or beaks at or near one end, the other ends being bent at an angle, the angularly-bent ends overlapping and adjustably connected together, so that by sliding them one along the other the tooth-space between the beaks is varied. These jaws are also connected together, so that they may rock one upon the other, or, in other words, so that they may have a pivotal movement. This rocking or pivotal movement also varies the tooth-space between the jaws. The varying of the tooth-space by sliding the jaws is preferably done before the clamp is put upon the tooth and in order to get the proper tooth-space to allow the clamp to be placed in position. The varying of the tooth-space by rocking the jaws is utilized while the clamp is on the tooth for the purpose of clamping it in position, the jaws being provided with a suitable means for producing this rocking or pivotal motion.

I claim—

1. A dental clamp, comprising two jaws having a sliding connection by which they are attached together near one end, said jaws being bent outwardly at the other ends, the outwardly-bent ends projecting at an angle to the ends which are connected together and provided with beaks or engaging faces between which the tooth is received, a spring connected with one jaw and bearing against the other, so as to normally force the beaks or engaging faces toward each other, and a mechanical reinforcing device for aiding the force of the spring in fixing the clamp in position.

2. A dental clamp, comprising two separate jaws sliding bodily with relation to each other to vary the tooth-space between them, one of said jaws provided with an engaging device which movably engages the other jaw, so as to connect the jaws together, a set-screw connected with one of said jaws and adapted to bear against the other, so that the jaws may be rocked one about the other in order to vary the distance between the engaging faces, the ends of said jaws bent outwardly so as to be in a different plane from the plane of said set-screw.

3. A dental clamp, comprising two jaws provided with opposed engaging faces or beaks, the ends of said jaws being bent at an angle to the parts upon which the beaks are formed, so as to be out of the plane of said beaks, said bent ends overlapping and connected together so that they may be slid one along the other to vary the tooth-space between the beaks.

4. A dental clamp, comprising two jaws provided with opposed engaging faces or beaks, the ends of said jaws being bent at an angle to the parts upon which the beaks are formed, said bent ends overlapping and connected together so that they may be slid one along the other to vary the tooth-space between the beaks, and means for pivotally moving said jaws with relation to each other when the clamp is attached to the tooth, so as to force the beaks toward the tooth.

J. AUSTIN DUNN.

Witnesses:
FANNY B. FAY,
HOMER L. KRAFT.